2,699,598

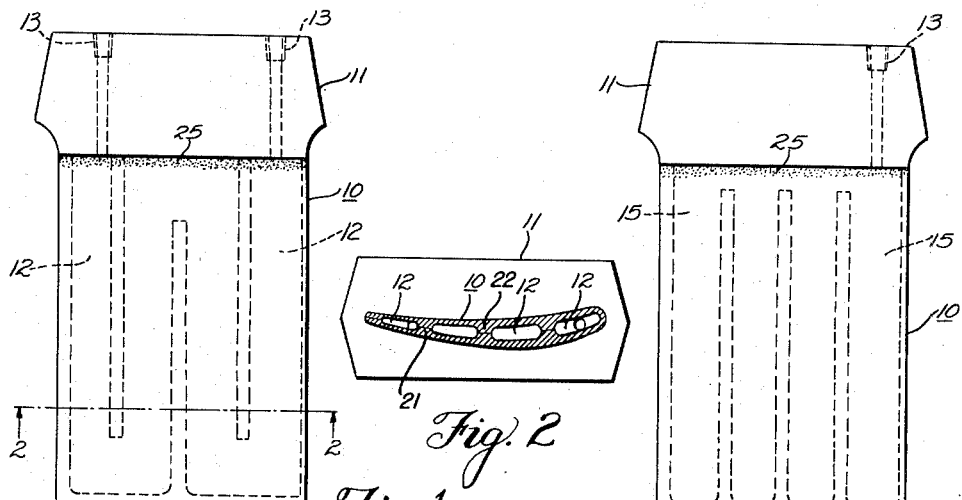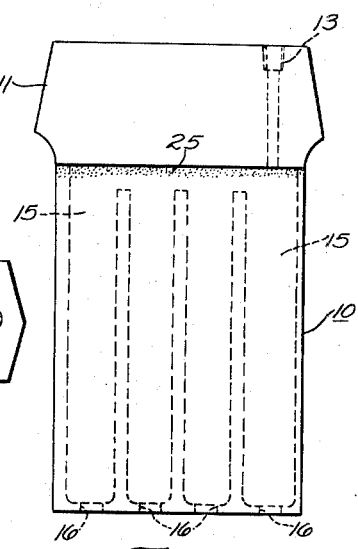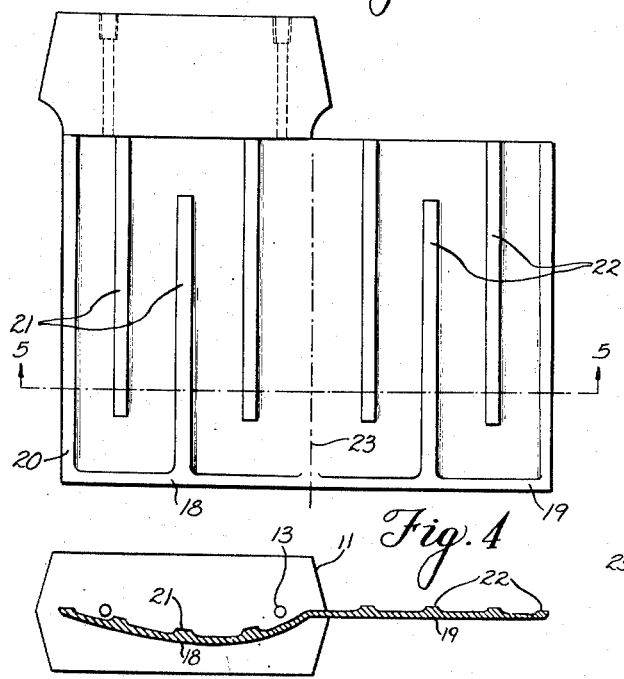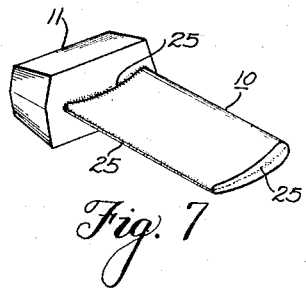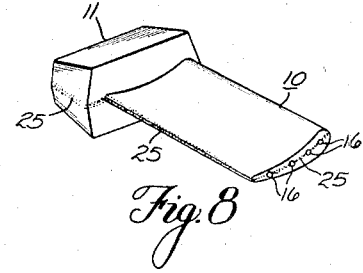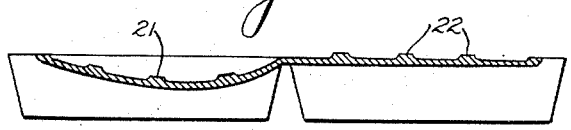
INVENTOR.
WILLIS V. DAUGHERTY
BY Woodling and Krost
attys United States Patent Office 2,699,598
Patented Jan. 18, 1955

METHOD OF MAKING TURBINE BLADES

Willis V. Daugherty, Clinton, N. Y., assignor to Utica Drop Forge & Tool Corporation, a corporation of New York Application February 8, 1952, Serial No. 270,652

5 Claims. (Cl. 29—156.8)

This invention relates to turbine blade construction and to methods of making the same.

An object of the invention is to provide improved methods of producing turbine blade blanks and for fabricating the same.

Another object is to provide an improved method of producing an improved metal blade structure having a coolant canal system with a porous body to sweat the coolant from the canal system out through the body of the blade to the surface thereof.

A further object is to provide an improved method of producing a metal blade structure having a thickened base portion and a thinner blade portion incorporating a continuous coolant canal extending from inlet and outlet ports in the thick base portion, and lengthwise of the blade portion whereby endless circulation for the coolant is established lengthwise of the base and blade portions.

Other objects and a fuller understanding of the invention may be had by referring to the following description and claims, taken in conjunction with the accompanying drawings, in which:

Figure 1 illustrates a finished turbine blade, with broken lines showing an internal coolant canal system within the blade;

Figure 2 is a section taken along line 2—2 of Figure 1;

Figure 3 illustrates a finished turbine blade having an internal coolant system which opens at the tip of the blade, the system being outlined with broken lines;

Figure 4 is a plan view of a primary structure as first formed, with the base portion formed in one piece, and the blade opened;

Figure 5 is a section taken along line 5—5 of Figure 4;

Figure 6 is a section view of a modified form of primary structure as first formed, the structure being similar to that of Figure 4 but with the base divided and opened;

Figure 7 is the structure of Figure 4 with the blade folded upon itself and welded along the edges; and Figure 8 is the structure of Figure 6 with the structure folded upon itself and welded along the edges, and coolant openings are illustrated at the tip.

Figures 1 and 2 of the drawings illustrate the finished blade construction having a blade portion 10 and a base 11. This illustrated type of turbine blade, or bucket, is just one example of the types of such turbine blades which may be made by the present invention. In order to lower the surface temperature of such turbine blades to a safe limit, a circulatory canal 12 is provided throughout the blade for conducting a coolant material through the blade to thereby conduct away excess heat stored in the body of the blade. The circulatory canal is connected to a coolant distribution system by fitting connections 13 provided in the base 11. Cooling may be accomplished by any suitable coolant, as for example metallic sodium, air, gases, or other suitable medium.

Figure 3 of the drawings illustrates a modification of the closed system illustrated in Figures 1 and 2, wherein delivery canals 15, rather than a circulatory canal, is provided to deliver a cooling medium from a source connected into the base 11 out through the blade at points removed from the base. Figure 3 illustrates the preferred arrangement wherein openings 16 in the tip of the blade allows the coolant to pass through the delivery canal 15 and out to atmosphere. In the case of a blade as illustrated in Figure 3, a gas coolant is the most desirable, and air will probably be the best selection.

The improved method by which the blade of this invention is made is set forth in the Figures 4–8 of the drawings. In Figure 4 a primary structure 20 is produced, usually by forging. This primary structure 20, which is further illustrated in Figure 5 of the drawings, comprises two half sections 18 and 19. The base 11 is forged in substantially finished form as a thick solid unit and is integrally connected to the thinner half section 18. Half section 18 is formed with fins, or ribs, 21, and half section 19 is formed with fins, or ribs, 22. These ribs 21 and 22 are positioned on the surface of the primary structure which will form the interior of the blade. They are laid out to define routing channels for circulating coolant within the blade, damp surface vibration, and collect and deliver surface heat into the circulating coolant. In the form illustrated in Figure 4, the primary structure bears a relationship to the finished construction which is very similar to an open book as compared to the closed book. The half sections 18 and 19 are in opened position and have a potential fold line 23 about which the half sections may be pivoted to close upon one another. It is acceptable to make separate half sections 18 and 19, but the unitary structure is believed to be preferred. Due to the formation of different thicknesses of the base and blade portions, a shoulder is formed at the juncture of the base 11 and blade portion 18, to which one transverse free edge of the blade 19 is later welded as will be hereinafter described.

In Figure 2 the ribs 21 and 22 are shown mated to define closed channels 12. It has been found that in some instances it is desirable to forge-weld these ribs together, but in many instances vibration damping effect can be accomplished by allowing these ribs to contact without welding. The coolant directing action is not impaired by some leakage. In fact, it has been found to be advantageous in some cases to have the ribs 21 and 22 offset with respect to one another and end in space. This modification is understandable in view of the drawings and, therefore, is not specifically illustrated. These ribs then serve only as baffles in coolant distribution, but have a remarkable vibration damping effect in some applications.

The next step in my improved blade construction process is to weld the open edges of the blade substantially as indicated by reference character 25 in Figure 7 of the drawings. The weld line extends across the shouldered junction between the solid base and the top of half section 19, in Figure 7, and then around the mating edges of sections 18 and 19. In the structure of Figures 6 and 8 the weld is required only along one edge and the end. Although it is conceivable that forge welding alone could be used to join the folded half sections, it is considered best to weld the mated edges by some acceptable welding procedure and then further forge to finish the blade in shape, and to work the welded edges. Working of the weld, when properly performed, changes the weld area from a physical structure similar to brittle cast iron, into a forged structure having improved tensile strength and resiliency.

After welding the edges, particularly in the illustrated blade which has a considerable curvature, the folded and welded primary structure is placed into a finishing die after being heated, and the two halves 18 and 19 are forged into the finished form. A drop hammer is the most suitable instrument for the final forging step. For some purposes the blade should be heated to the forge-weld temperature to cause the ribs, when mated, to forge-weld together. When vibration damping problems warrant, a lesser temperature is preferable, in which event the ribs, when mated, will be in tight contact but unwelded. In Figure 2 the ribs are mated but not necessarily welded together.

In Figure 6 of the drawings a modification is illustrated which is in many ways preferable to the construction previously discussed. Figure 6 is a sectional view taken along a section similar to that from which the Figure 5 was derived. In Figure 6 it will be seen that the primary difference is in the base 11. The base illustrated in Figure 6 is divided along with the half sections 18 and 19 whereby, when folded into the position shown in Figure 8 of the drawings and welded, the only weld line extends along one edge only and the end of the blade. In other words, the primary blank is shaped into two halves, each with a thick solid base portion and a thinner blade portion extending integrally from one end thereof at substantially the same plane of the base. The two blade portions are integrally joined along a longitudinal fold line and are folded along this line to bring them into registration for welding of their coinciding or registering free edges as shown in Fig. 8. The advantage of this modification is the elimination of welding along the top of half section 19 to join the section 19 with the base 11, as illustrated in Figure 7 of the drawings.

It has been discovered that a still further improvement in the cooling of such turbine blade structures may be accomplished by forming the primary structures of porous metal rather than solid metal, in order to allow the coolant to bleed from the circulatory canal to the external surface of the blade and thereby permit a sweating action for further cooling of the blade by evaporation of coolant from the surface of the blade. The methods of powder metallurgy are well known, and the primary structures illustrated in Figures 4, 5, and 6 may be produced by powder metallurgy in order to create the sweat cooling action in addition to the circulatory cooling previously discussed.

Also, it has been found that a unique method of making a porous metal for this purpose is accomplished by stacking fine wire screen sheets together to form the forging stock used to produce the primary structures of Figs. 4 and 6. The screen, when heated to the welding temperature, will compress and weld together in a unitary structure, but the openings in the screen will not all close during the forging process, but rather they create a plurality of tortuous paths throughout the body of the blade. These tortuous paths allow a slow seepage of coolant to come from the central circulatory canal. It is impractical to attempt to illustrate the difference of appearance of a porous metal and an impervious structure, and it is believed unnecessary to illustrate a pile of wire screen sheets in order to convey the teaching of this invention. Therefore, these modifications have not been illustrated.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. The method of making an airfoil blade structure having a cooling system including a main circulatory canal and pores bleeding from said canal to the surface of the structure comprising the steps of, stacking a plurality of metal screen sheets into a forging stock, forging said stock into a primary structure of porous metal in the form of two halves of the finished structure in opened form and joined at a fold line, each half having raised ribs defining a recess channel extending in a circulatory path thereafter folding said primary structure about said fold line with said recess channels cooperating to form a circulatory canal system within the closed airfoil blade, and uniting the two halves into a unitary structure.

2. The method of making an airfoil blade structure having a cooling system including a main circulatory canal and pores bleeding from said canal to the surface of the structure comprising the steps of, stacking a plurality of metal screen sheets into a forging stock, forging said stock into a primary structure of porous metal in the form of two halves of a primary structure in opened form and joined at a fold line, thereafter folding said primary structure about said fold line, and uniting the two halves into a unitary structure.

3. The method of making an airfoil blade with a thickened solid base and a blade portion, comprising the steps of shaping a primary structure into a thick solid base with a first thinner blade portion extending in the plane of said base integrally from one end thereof to form a shoulder portion and a second equally thin blade portion extending integrally and laterally from a longitudinal portion of said first blade portion in the plane of said base to define a pair of foldable blade portions and a longitudinal fold line therebetween, folding said second blade portion upon said fold line and disposing said second blade portion in registration with said first blade portion with the free boundary edges of one blade portion coinciding with the free edges of the other blade portion and with the innermost free transverse edge of said second blade portion arranged against said shoulder portion formed at the juncture of said base and first blade portion, and welding together said free edges of said first and second blade portions and the innermost free transverse edge of said second blade portion to said shoulder portion of said base.

4. The method of making an airfoil blade with a thickened solid base and a blade portion, comprising the steps of shaping a primary structure into two halves, each with a thick solid base portion and a thinner blade portion extending integrally from one end thereof in substantially the same plane of said base portion, said two blade portions and base portions being integrally joined along a longitudinal fold line, folding the two halves along said fold line to bring them into registration with two free edges of said blade portions coinciding and with the side surfaces of said base portions coinciding, and welding together said coinciding two free edges of the blade portions and the three sides of said base portions.

5. The method of making an airfoil blade with a thickened solid base and a blade portion, comprising the steps of shaping a primary structure into a thick solid base with coolant inlet and outlet ports and with a first thinner blade portion extending in the plane of said base integrally from one end thereof and a second equally thin blade portion extending integrally and laterally from a longitudinal portion of said first blade portion in the plane of said base to define a pair of foldable blade portions with a longitudinal fold line therebetween, forming said pair of blade portions with staggered ribs, folding said second blade portion with the free boundary edges of one blade portion coinciding with the free boundary edges of the other blade portion and with the innermost free transverse edge of said second blade portion arranged against said base portion and with said ribs of said blade portion substantially coinciding to provide a continuous coolant passage having one end communicating with said coolant inlet port and the other end of said passage communicating with said coolant outlet port, and uniting the free edges of said first and second blade portions into a unitary structure.

References Cited in the file of this patent

UNITED STATES PATENTS

| | | |
|---|---|---|
| 1,177,320 | Grabowsky | Mar. 28, 1916 |
| 1,458,604 | Woodward | June 12, 1923 |
| 1,606,884 | Mann | Nov. 16, 1926 |
| 1,996,850 | Bendix | Apr. 9, 1935 |
| 2,025,922 | Weinrich | Dec. 31, 1935 |
| 2,312,094 | Harmon | Feb. 23, 1943 |
| 2,378,059 | Brauchler | June 12, 1945 |
| 2,439,424 | Goodloe | Apr. 13, 1948 |
| 2,457,202 | Brady | Dec. 28, 1948 |
| 2,462,316 | Goodloe | Feb. 22, 1949 |
| 2,512,264 | Brauchler | June 20, 1950 |
| 2,514,525 | Stulen | July 11, 1950 |
| 2,563,269 | Price | Aug. 7, 1951 |
| 2,565,594 | Constant | Aug. 28, 1951 |